US 6,314,474 B1

(12) United States Patent
Walter et al.

(10) Patent No.: US 6,314,474 B1
(45) Date of Patent: *Nov. 6, 2001

(54) EFFICIENT INFORMATION EXCHANGE BETWEEN AN ELECTRONIC BOOK AND A CARTRIDGE

(75) Inventors: Erik Walter, La Jolla; Richard Wotiz, Saratoga; Garth Conboy, La Jolla; James Sachs, Menlo Park, all of CA (US)

(73) Assignee: Softbook Press, Inc., Menlo Park, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/173,907

(22) Filed: Oct. 16, 1998

(51) Int. Cl.[7] ........................................................ G06F 3/00
(52) U.S. Cl. ................................ 710/14; 710/20; 710/33; 709/201; 709/203; 711/144; 711/154
(58) Field of Search ................................. 710/14, 20, 33; 709/201, 203, 213, 232; 711/144, 154, 156; 707/103, 10; 701/201

(56) References Cited

U.S. PATENT DOCUMENTS

| D. 276,626 | 12/1984 | Lockwood . |
| D. 289,777 | 5/1987 | Thomas . |
| D. 330,544 | 10/1992 | Kane . |

(List continued on next page.)

FOREIGN PATENT DOCUMENTS

| 0 390 611 | 3/1990 | (EP) . |
| 2 657 451 | 1/1990 | (FR) . |
| 2 657 187 | 7/1991 | (FR) . |
| 2 149 544 | 6/1995 | (GB) . |
| 57 147767 | 12/1982 | (JP) . |
| WO 87/01481 | 3/1987 | (WO) . |
| WO 89/05023 | 6/1989 | (WO) . |
| WO 97 22112 A | 6/1997 | (WO) . |
| WO 97/20274 | 6/1997 | (WO) . |

OTHER PUBLICATIONS

Dvorak, et al. Methodology for User Centred Link Structures for Textbook to Hypertext Conversion, IEEE, Jan. 1992, pp. 619–628.
Pobiak Adjustable Access Electronic Books, IEEE, Jan. 1992, pp. 90–94.
Ramos Making Book on Electronic Books, College Store Journal—Sep./Oct. 1992.
Cox Technology Threatens to Shatter the World of College Textbooks The Wall Street Journal—Electronic Campus, Jun. 1, 1993.
Watanabe et al., Visual Interface for Retrieval of Electronic–Formed Books, IEEE, Jul. 1993, pp. 692–695.
The Heller Report, Oct. 1993.
Ziegler IBM to Unveil Plan to Skip Disks, Send Software by Satellite, The Wall Street Journal, Nov. 1, 1994.
Fisher This Little Compute rTries to be a Book, St. Louis Post–Dispatch, Jan. 4, 1995.
Steinert–Threlkeld Now, Data by Satellite, Inter@ctive Week (no date).

*Primary Examiner*—David Wiley
*Assistant Examiner*—Firmin Backer
(74) *Attorney, Agent, or Firm*—Townsend and Townsend and Crew LLP

(57) ABSTRACT

The present invention is a method and apparatus for exchanging information between an electronic book and a cartridge. The electronic book has an on-board storage and the cartridge contains a cartridge storage. It is determined if the cartridge is present. If the cartridge is present, a transfer mode is identified. The information between the on-board storage and the cartridge storage is then transferred according to the identified transfer mode.

30 Claims, 4 Drawing Sheets

U.S. PATENT DOCUMENTS

| | | |
|---|---|---|
| D. 339,329 | 9/1993 | Lacko . |
| D. 346,620 | 5/1994 | McSorely . |
| D. 359,306 | 6/1995 | Lande et al. . |
| D. 362,271 | 9/1995 | Luong . |
| D. 362,272 | 9/1995 | Luong . |
| D. 362,461 | 9/1995 | Luong . |
| 3,718,906 | 2/1973 | Lightner . |
| 4,159,417 | 6/1979 | Rubincam . |
| 4,490,810 | 12/1984 | Hon . |
| 4,545,023 | 10/1985 | Mizzi . |
| 4,575,621 | 3/1986 | Dreifus . |
| 4,591,974 | 5/1986 | Dornbush et al. . |
| 4,597,058 | 6/1986 | Izumi et al. . |
| 4,601,011 | 7/1986 | Grynberg . |
| 4,649,499 | 3/1987 | Sutton et al. . |
| 4,682,161 | 7/1987 | Bugg . |
| 4,725,977 | 2/1988 | Izumi et al. . |
| 4,779,080 | 10/1988 | Coughlin et al. . |
| 4,820,167 | 4/1989 | Nobles et al. . |
| 4,855,725 | 8/1989 | Fernandez . |
| 4,899,292 | 2/1990 | Montagna et al. . |
| 4,916,441 | 4/1990 | Gombrich . |
| 4,918,632 | 4/1990 | York . |
| 4,972,496 | 11/1990 | Sklarew . |
| 4,974,178 * | 11/1990 | Izeki et al. ............................ 364/523 |
| 4,985,697 | 1/1991 | Boulton . |
| 5,021,989 | 6/1991 | Fujisawa et al. . |
| 5,025,373 | 6/1991 | Keyser, Jr. et al. . |
| 5,031,119 | 7/1991 | Dulaney et al. . |
| 5,065,345 | 11/1991 | Knowles et al. . |
| 5,091,939 | 2/1992 | Cole et al. . |
| 5,109,354 | 4/1992 | Yamashita et al. . |
| 5,115,508 | 5/1992 | Hatta . |
| 5,121,492 | 6/1992 | Saville, III et al. . |
| 5,133,076 | 7/1992 | Hawkins et al. . |
| 5,146,552 | 9/1992 | Cassorla et al. . |
| 5,157,491 | 10/1992 | Kassatly . |
| 5,157,737 | 10/1992 | Sklarew . |
| 5,157,783 | 10/1992 | Anderson et al. . |
| 5,199,104 | 3/1993 | Hirayama . |
| 5,203,001 | 4/1993 | Yanagiuchi et al. . |
| 5,214,696 | 5/1993 | Keiser, II et al. . |
| 5,221,838 | 6/1993 | Gutman et al. . |
| 5,222,136 | 6/1993 | Rasmussen et al. . |
| 5,226,080 | 7/1993 | Cole et al. . |
| 5,231,662 | 7/1993 | van Rumpt et al. . |
| 5,233,333 | 8/1993 | Borsuk . |
| 5,239,665 * | 8/1993 | Tsuchiya ............................. 395/800 |
| 5,245,656 | 9/1993 | Loeb et al. . |
| 5,247,661 | 9/1993 | Hager et al. . |
| 5,253,294 | 10/1993 | Maurer . |
| 5,319,582 | 6/1994 | Ma . |
| 5,333,116 | 7/1994 | Hawkins et al. . |
| 5,339,091 | 8/1994 | Yamazaki et al. . |
| 5,359,707 | 10/1994 | Sato . |
| 5,365,598 | 11/1994 | Sklarew . |
| 5,367,621 | 11/1994 | Cohen et al. . |
| 5,379,057 | 1/1995 | Clough et al. . |
| 5,388,196 | 2/1995 | Pajak et al. . |
| 5,392,387 | 2/1995 | Fitzpatrick et al. . |
| 5,398,310 | 3/1995 | Tchao et al. . |
| 5,404,505 | 4/1995 | Levinson . |
| 5,428,606 | 6/1995 | Moskowitz . |
| 5,438,344 | 8/1995 | Oliva . |
| 5,457,746 | 10/1995 | Dolphin . |
| 5,463,725 | 10/1995 | Henckel et al. . |
| 5,465,213 * | 11/1995 | Ross ..................................... 364/468 |
| 5,467,102 | 11/1995 | Kuno et al. . |
| 5,475,399 | 12/1995 | Borsuk . |
| 5,477,510 | 12/1995 | Ukita . |
| 5,483,586 | 1/1996 | Sussman . |
| 5,528,281 * | 6/1996 | Grady et al. ............................ 348/7 |
| 5,598,470 | 1/1997 | Cooper et al. . |
| 5,615,264 | 3/1997 | Kazmierczak et al. . |
| 5,629,980 | 5/1997 | Stefik et al. . |
| 5,638,443 | 6/1997 | Stefik et al. . |
| 5,673,417 | 9/1997 | Liao ..................................... 395/488 |
| 5,697,793 | 12/1997 | Huffman et al. . |
| 5,719,943 | 2/1998 | Amada et al. . |
| 5,734,823 * | 3/1998 | Saigh et al. ..................... 395/200.06 |
| 5,734,891 | 3/1998 | Saigh . |
| 5,847,698 * | 12/1998 | Reavey et al. ........................ 345/173 |
| 5,902,353 * | 5/1999 | Reber et al. .......................... 709/219 |
| 5,915,252 * | 6/1999 | Misheski .............................. 707/103 |
| 5,956,048 * | 9/1999 | Gaston ................................. 345/507 |
| 6,044,441 * | 3/2000 | Malinowski ......................... 711/144 |

* cited by examiner

EFFICIENT INFORMATION EXCHANGE BETWEEN AN ELECTRONIC BOOK AND A CARTRIDGE

BACKGROUND

1. Field of the Invention

This invention relates to electronic books. In particular, the invention relates to information exchange with electronic books using cartridge.

2. Description of Related Art

Advances in computer and communication technology have provided the consumers a convenient and economical means to access information in a variety of media. One particular area of information access is the electronic books. An electronic book is a viewing device that receives printed materials downloaded from an information network. A user of an electronic book can read downloaded contents of books and printed materials subscribed from a participating bookstore at his or her own convenience without the need to purchase the printed copies of the books.

An electronic book typically includes programmable memories to store downloaded information in forms of text, graphics, and images. In addition, an electronic book also includes other programmable read only memories (PROM) to store the operating system or code and the starting content. The PROM code includes the executable code that control, manage, and coordinate the operation of the electronic book. The starting content stores static data and parameters that are used by the PROM code for the functioning of the electronic book. During the manufacturing process, the PROM code and starting content are initialized in the assembly line. For production quantities, it is desirable that the initialization of the PROM code and starting content be performed as efficiently as possible to reduce costs and production time in the manufacturing process. In addition, when there are software or data updates for electronic books that are off the assembly line, it is preferable to be able to update the PROM code and starting content at the field rather than to recall the electronic books and re-initialize the PROM code and the starting content at the manufacturing facility. When an electronic book is repaired or service, it is useful to be able to keep a back-up copy of the PROM code and file system.

Initialization of the PROM code and content at the manufacturing facility has a number of problems. An assembly worker has to carefully install the PROM devices into the electronic book in the assembly line. This process is tedious and time consuming. Updating the PROM code and content at the field is even more troublesome. Normally a user is not well trained to physically replace the old PROM devices with the updated ones. Even when the replacement is performed by a trained technician at the field service location, the process is prone to error, tedious, and may cause potential physical damage to the electronic book.

Therefore there is a need in the technology to provide a simple and efficient method to exchange the information contained in the electronic book.

SUMMARY

The present invention is a method and apparatus for exchanging information between an electronic book and a cartridge. The electronic book has an on-board storage and the cartridge contains a cartridge storage. It is determined if the cartridge is present. If the cartridge is present, a transfer mode is identified. The information between the on-board storage and the cartridge storage is then transferred according to the identified transfer mode.

BRIEF DESCRIPTION OF THE DRAWINGS

The features and advantages of the present invention will become apparent from the following detailed description of the present invention in which.

DESCRIPTION

The present invention is a method and apparatus for exchanging information contained in an electronic book. A removable cartridge having sufficient storage is used to transfer information from and/or to the on-board PROM devices. An upgrade tag is present when the cartridge is inserted to the electronic book. The upgrade tag is recognized by the on-board processor. The processor then initiates the information exchange between the cartridge and the on-board PROM devices. The technique is simple and efficient for assembly at the manufacturing facility and for field update.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
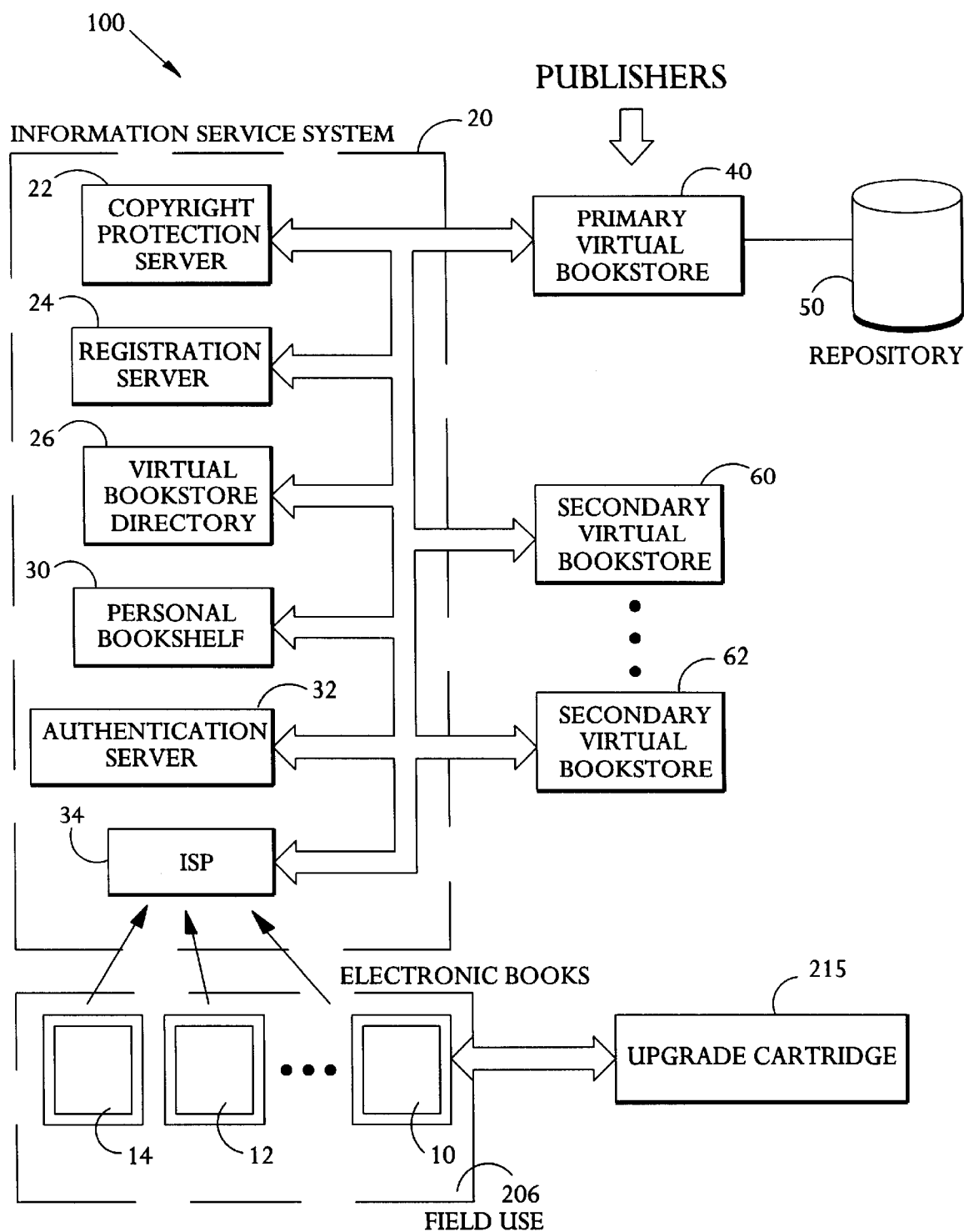
FIG. 1 is a diagram illustrating a system in which one embodiment of the invention can be practiced.

FIG. 1 is a diagram illustrating a system in which one embodiment of the invention can be practiced.

Referring to FIG. 1, the system comprises: (a) at least one portable electronic book 10 operative to request a digital content from a catalog of distinct digital contents, to receive and display the requested digital content in readable form; (b) an information services system 20 which includes an authentication server 32 for authenticating the identity of the requesting portable electronic book 10 and a copyright protection server 22 for rendering the requested digital content sent to the requesting portable electronic book 10 readable only by the requesting portable electronic book 10; (c) at least one primary virtual bookstore 40 in electrical communication with the information services system 20, the primary virtual bookstore being a computer-based storefront accessible by the portable electronic book and including the catalog of distinct digital contents; and (d) a repository 50, in electrical communication with the primary virtual bookstore 40, for storing the distinct digital contents listed in the catalog.

The system preferably includes more than one portable electronic book 10, to be commercially viable. This is illustrated in FIG. 1 by including the portable electronic books 12 and 14. The system also preferably includes more than one primary virtual bookstore 40, each serving a different set of customers, each customer owning a portable electronic book.

In one embodiment of the invention, the system further comprises a secondary virtual bookstore 60 in electrical communication with the information services system 20. In this case, the information services system 20 also includes a directory of virtual bookstores 26 in order to provide the portable electronic book 10 with access to the secondary virtual bookstore 60 and its catalog of digital contents.

The information services system 20 can optionally include a notice board server 28 for sending messages from one of the virtual bookstores, primary or secondary, to a portable electronic book in the system.

The information services system 20 also includes a registration server 24 for keeping track of the portable electronic books that are considered active accounts in the system and for ensuring that each portable electronic book is associated with a primary virtual bookstore in the system. In the case where the optional notice board server 28 is included in the information services system 20, the registration server 24 also allows each portable electronic book user to define his/her own notice board and document delivery address.

The information services system 20 preferably comprises a centralized bookshelf 30 associated with each portable electronic book 10 in the system. Each centralized bookshelf 30 contains all digital contents requested and owned by the associated portable electronic book 10. Each portable electronic book 10 user can permanently delete any of the owned digital contents from the associated centralized bookshelf 30. Since the centralized bookshelf 30 contains all the digital contents owned by the associated portable electronic book 10, these digital contents may have originated from different virtual bookstores. The centralized bookshelf 30 is a storage extension for the portable electronic book 10. Such storage extension is needed since the portable electronic book 10 has limited non-volatile memory capacity.

The user of the portable electronic book 10 can add marks, such as bookmarks, inking, highlighting and underlining, and annotations on a digital content displayed on the screen of the portable electronic book, then stores this marked digital content in the non-volatile memory of the electronic book 10. The user can also upload this marked digital content to the information services system 20 to store it in the centralized bookshelf 30 associated with the portable electronic book 10, for later retrieval. It is noted that there is no need to upload any unmarked digital content, since it was already stored in the centralized bookshelf 30 at the time it was first requested by the portable electronic book 10.

The information services system 20 further includes an Internet Services Provider 34 for providing Internet network access to each portable electronic book in the system.

Figure 2:
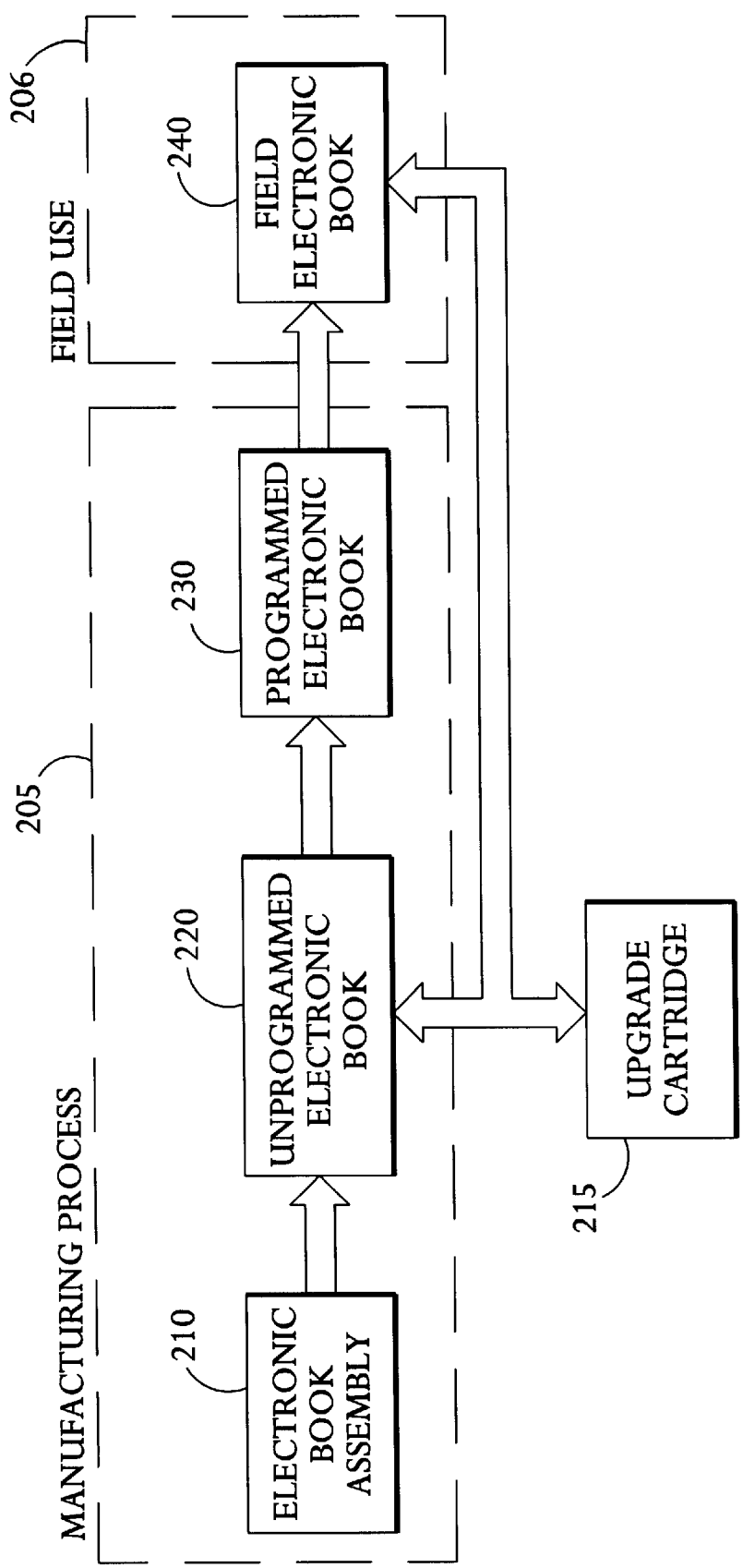
FIG. 2 is a diagram illustrating an environment for information exchange between the on-board PROM devices and cartridge according to one embodiment of the invention.

FIG. 2 is a diagram illustrating an environment for information exchange between the on-board PROM devices and cartridge according to one embodiment of the invention. The environment for the information exchange includes a manufacturing process 205, a field use 206, and an upgrade cartridge 215.

The manufacturing process 205 includes an electronic book assembly 210, an unprogrammed electronic book 220, and a programmed electronic book 230. The electronic book assembly 210 is the integration of the electronic book parts and components. The unprogrammed electronic book 220 is the completely assembled electronic book which includes all the functional parts of the electronic book. The unprogrammed electronic book 220 contains unprogrammed storage devices. The upgrade cartridge 215 contains information to be transferred to the unprogrammed electronic book 220. The programmed electronic book 230 is the final product coming out of the assembly line at the manufacturing facility. The programmed electronic book 230 includes the information transferred from the upgrade cartridge 215.

The field use 206 is the environment where the programmed electronic book is used. The field use 206 includes a field electronic book 240. The field electronic book 240 is the electronic book in use by the user. The field electronic book 240 may contain content downloaded from the bookstore or the server. The field electronic book 240 receives the updated information from the upgrade cartridge 215, or transfers its content to the upgrade cartridge 215.

Figure 3:
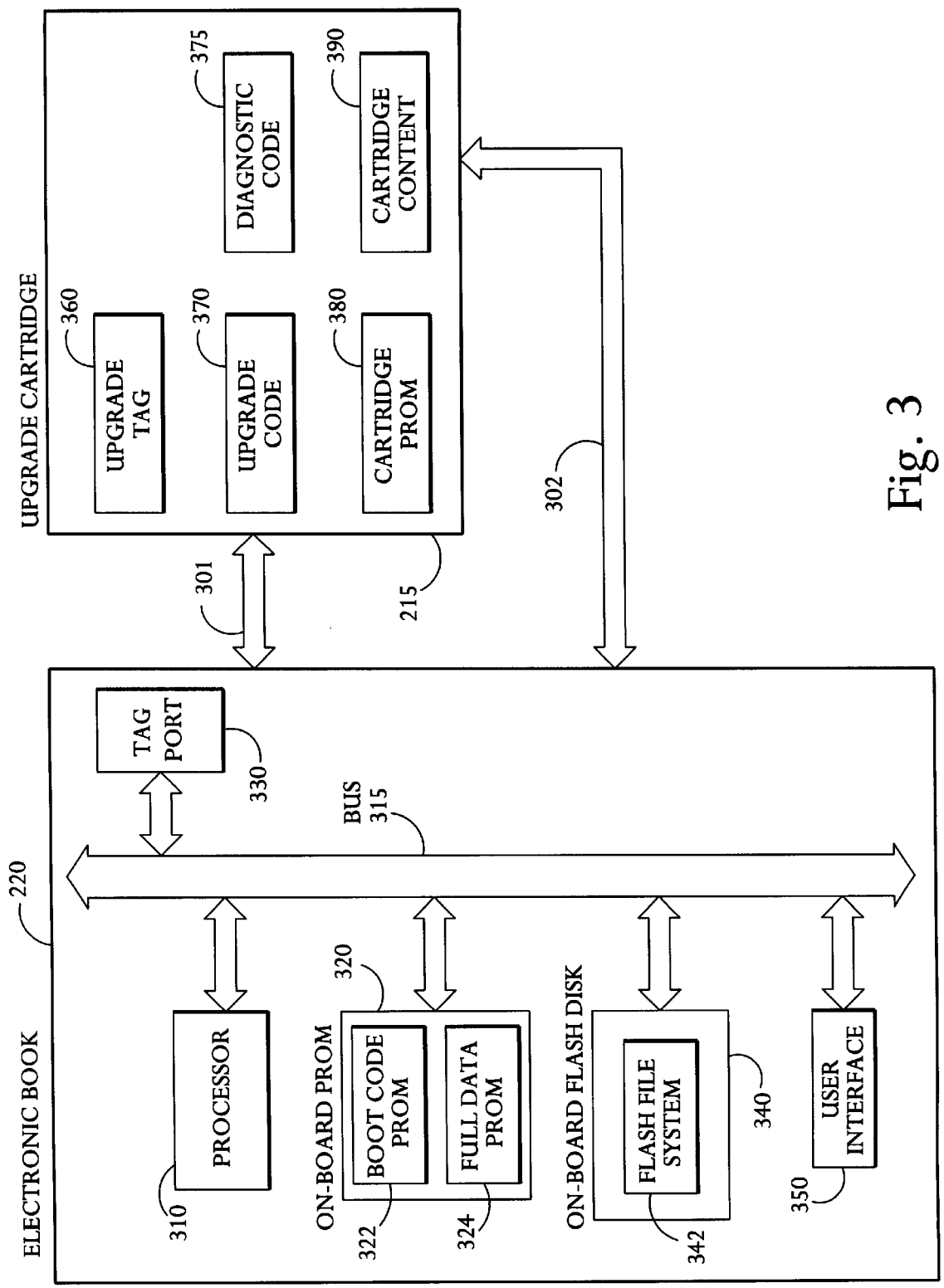
FIG. 3 is a diagram illustrating an interface between on-board PROM devices and the upgrade cartridge according to one embodiment of the invention.

FIG. 3 is a diagram illustrating an interface between on-board PROM devices and the upgrade cartridge according to one embodiment of the invention. The interface provides information paths between the electronic book 220/240 and the cartridge 215. The information paths or interface include a path 301 and a path 302. The paths 301 and 302 may be separate or combined. The distinction between the paths 301 and 302 may be logical or physical. In one embodiment, the distinction is logical. In other words, the paths 301 and 302 correspond to two separately addressed paths but the same physical connections.

The electronic book 220/240 includes a processor 310, a bus 315, an on-board PROM 320, an upgrade tag port 330, a user interface 350, and an on-board flash disk 340. The processor 310 is any microprocessor that can access memory devices in the on-board PROM 320, on-board flash disk 340, and the cartridge 215. The bus 315 provides the interface between the processor 310 and the on-board PROM 320 and the on-board flash disk 340. The bus 315 includes address bus, data bus, and control bus. The upgrade tag port 330 is an interface port that allows the cartridge 215 to be inserted or plugged into the electronic book 220. The upgrade tag port 330 may be an input/output (I/O) port or a buffer that is mapped onto the address space of the processor 310.

The on-board PROM 320 includes a boot code PROM 322 and a full data PROM 324. The boot code PROM 322 contains executable boot-up code to control and utilize the full data PROM 324. The boot-up code is a program or code that is executed when the electronic book 220 is going through the power-up sequence. The full data PROM 324 contains the operating system and other information pertinent to the operation of the electronic book 220.

Upon power up, the processor 310 begins executing the boot-up code by fetching the first instruction in the boot code PROM 322. The boot-up code includes sequence for initialization and upgrade tag matching. The upgrade tag matching is an operation to determine if a cartridge is inserted or plugged into the electronic book at the upgrade tag port 330. If a cartridge is present at the upgrade tag port 330, the upgrade tag matching further determines if the cartridge is an upgrade cartridge by reading the upgrade tag from the cartridge 215 and compares the cartridge tag with the upgrade tag code. If the cartridge tag matches the upgrade tag code, the processor 310 will proceed to perform the information exchange as determined by other commands. If there is no cartridge present, the boot-up code begins the normal operation by accessing the full data PROM 324 and proceeds with the normal operation.

The on-board flash disk 340 includes a flash file system 342. The flash file system 342 is a flash PROM containing the content of the electronic book 220. The content is organized according to a filing system. The flash file system 342 is electrically erasable and programmable. In one embodiment, the flash file system 342 is implemented by a flash memory.

The user interface 350 includes interface circuit to allow the user, the field technician, or the assembly worker to select choice for the information exchange. The user interface 350 may include interface to buttons, softkeys, or switches which are designated to activate certain functions or commands. Examples of these functions or commands include "copy" (or "back-up") and "program" (or "restore").

The cartridge 215 includes an upgrade tag 360, an upgrade code 370, a diagnostic code 375, a cartridge PROM 380, and a cartridge content 390. The cartridge PROM 380 is coupled to the full data PROM 324 via the path 301. The cartridge content 390 is coupled to the on-board flash disk 340 via the path 302. As discussed above, the two paths 301 and 302 may correspond to the same physical bus structure.

The upgrade tag 360 is a tag code to signify that the cartridge 215 is an upgrade cartridge. The upgrade tag 360 contains an identification code that is matched with the upgrade tag code stored in the electronic book 220. The upgrade tag 360 is read by the processor 310 at boot-up time to determine if the upgrade cartridge 215 is inserted to the electronic book 220. The upgrade tag 360 may be set by using mechanical means (e.g., switches, shorting plugs) or electronic means (e.g., bit pattern stored in register or memory).

The upgrade code 370 is a program executable by the processor 310 when the cartridge 215 is inserted to the electronic book 220. When the upgrade tag 360 is matched with the predefined tag code in the electronic book 220, the processor 310 accesses the upgrade code 370. The processor 310 can execute the upgrade code 370 directly or transfer the upgrade code 370 to its memory and execute the transferred upgrade code from its memory. The upgrade code 370 contains sufficient code to allow the transfer of information between the electronic book 220 and the cartridge 215. In addition, the upgrade code 370 may also contain user interface code to allow the user, the field technician, or the assembly worker to select the option to copy or to restore.

The diagnostic code 375 is a program executable by the processor 310 to perform a number of diagnostic and testing steps during manufacturing or check-out. The execution of the diagnostic code 375 is optional and is selected by the field technician or the assembly worker.

The cartridge PROM 380 is a storage device that contains the information or data for the operation of the electronic book 220. The cartridge PROM 380 corresponds to the full data PROM 324 in the electronic book 220. In one embodiment, the cartridge PROM 380 is implemented by a programmable memory or flash memory that can be erased and re-programmed. If a copy operation is selected, the content of the full data PROM 324 is transferred to the cartridge PROM 380 via the data path 301. If a restore operation is selected, the content of the cartridge PROM 380 is transferred to the full data PROM 324 via the data path 301.

The cartridge content 390 is a storage device that contains the content of the reading printed materials or books stored in the electronic book 220. The cartridge content 390 corresponds to the flash file system 342 in the electronic book 220. In one embodiment, the cartridge content 390 is implemented by a programmable memory or flash memory that can be erased and re-programmed. If a copy operation is selected, the content of the flash file system 342 is transferred to the cartridge content 390 via the data path 302. If a restore operation is selected, the content of the cartridge content 390 is transferred to the flash file system 342 via the data path 302.

Figure 4:
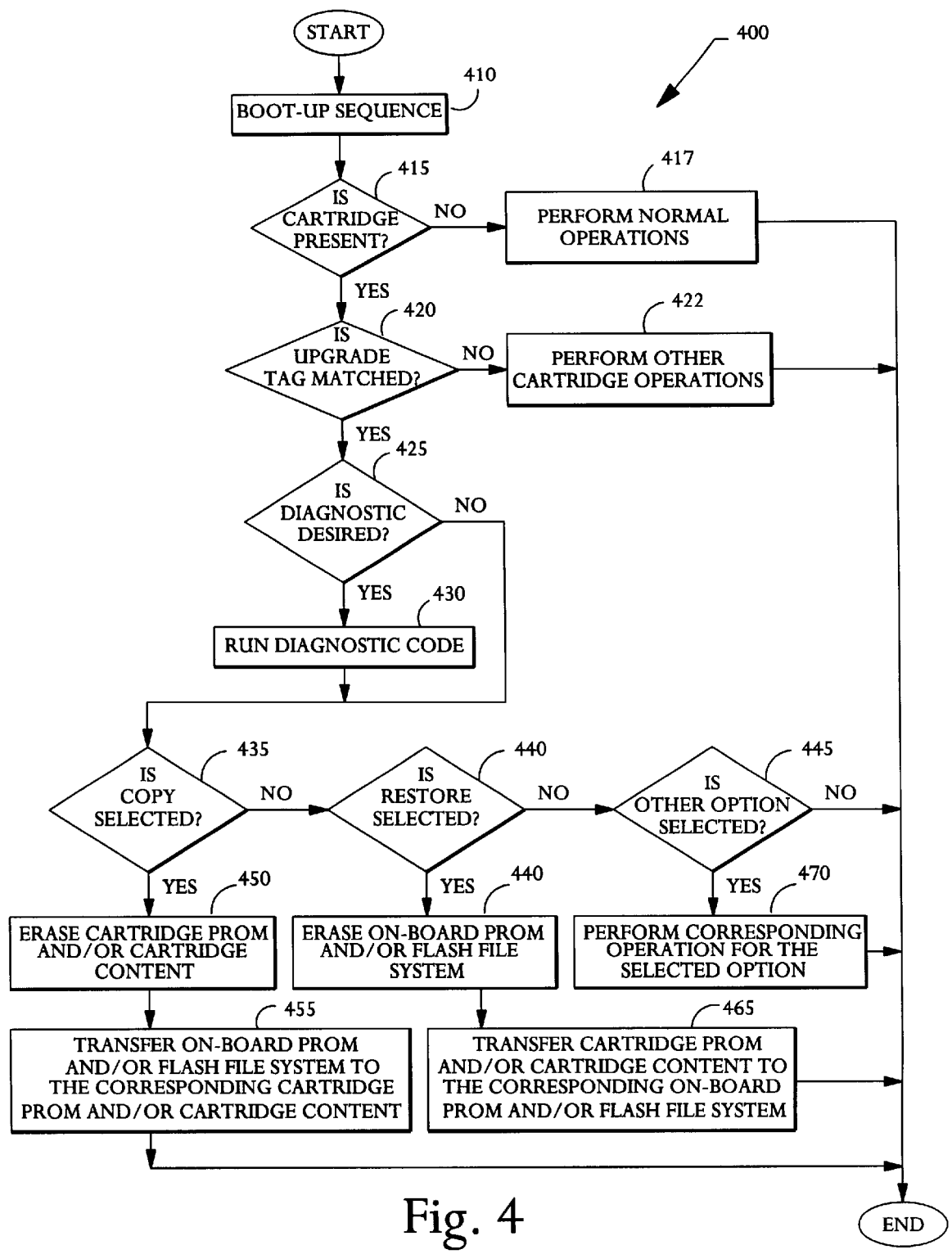
FIG. 4 is a flowchart illustrating a process of exchanging information between the electronic book and the upgrade cartridge according to one embodiment of the invention.

FIG. 4 is a flowchart illustrating a process of exchanging information between the electronic book and the upgrade cartridge according to one embodiment of the invention.

Upon START, the process 400 executes a boot-up sequence using the boot-up code to initialize the electronic book (Block 410). Then the process 400 determines if a cartridge is present or plugged in (Block 415). If a cartridge is not present, the process 400 performs the normal operation (Block 417) and is terminated. If a cartridge is present, the process 400 determines if the present cartridge is the upgrade cartridge by matching the cartridge tag with the upgrade code (Block 420). If there is no match, then the cartridge is not an upgrade cartridge and the process 400 checks for other cartridge tags and performs the corresponding cartridge tasks (Block 422) and is then terminated. If there is an upgrade tag match, then the cartridge is an upgrade cartridge.

The process 400 then determines if a diagnostic is desired (Block 425). If a diagnostic is desired, the process 400 runs the diagnostic code from the upgrade cartridge (Block 430) and then proceeds to block 435. If a diagnostic is not desired, the process 400 goes to block 435 to determine if a copy operation is selected. If a copy operation is not selected, the process 400 determines if a restore operation is selected (Block 440). If a copy operation is selected, the process 400 erases the cartridge PROM and/or the cartridge content (Block 450). Then the process 400 transfers the contents of the on-board PROM and/or the on-board flash file system to the corresponding cartridge PROM and/or cartridge content (Block 455). The process 400 is then terminated.

If a restore operation is selected, the process 400 erases the on-board PROM and/or the on-board flash file system (Block 460). Then the process 400 transfers the cartridge PROM and/or the cartridge content to the corresponding on-board PROM and/or the on-board flash file system (Block 465). The process 400 is then terminated.

If a restore operation is not selected, the process 400 determines if other operations are selected (Block 445). If not, the process 400 is terminated. If other operations are selected, the process 400 performs the corresponding operations (Block 470) and is then terminated.

The present invention provides a simple and efficient technique to exchange information between the electronic book and an upgrade cartridge. The technique facilitates the programming of the electronic book at the manufacturing phase. The technique also simplifies the upgrade of the electronic book in the field.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   (a) matching an upgrade tag in a cartridge with a predefined tag code stored in an electronic book to determine if the cartridge is present at a port of the electronic book having an on-board storage, the cartridge containing a cartridge storage and an upgrade code;
   (b) if the cartridge is present, identifying a transfer mode; and
   (c) executing the upgrade code to transfer information between the on-board storage and the cartridge storage according to the identified transfer mode.

2. The method of claim 1 wherein executing the upgrade code comprises transferring the upgrade code to the electronic book.

3. The method of claim 1 wherein the transfer mode is one of a copy mode and a restore mode.

4. The method of claim 3 wherein transferring information transfers content of the on-board storage to the cartridge storage when the identified transfer mode is the copy mode.

5. The method of claim 3 wherein transferring information transfers content of the cartridge storage to the on-board storage when the identified transfer mode is the restore mode.

6. The method of claim 1 wherein the on-board storage is one of a full data programmable read-only memory (PROM) and a flash file system.

7. The method of claim 6 wherein the cartridge storage is one of a cartridge programmable read-only memory (PROM) and a cartridge content.

8. The method of claim 7 wherein the full data PROM corresponds to the cartridge PROM during a transfer of information between the on-board storage and the cartridge storage.

9. The method of claim 7 wherein the flash file system corresponds to the cartridge content during a transfer of information between the on-board storage and the cartridge storage.

10. The method of claim 1 wherein the transfer mode is selected by a user.

11. An apparatus comprising:
a cartridge storage accessible to a processor in an electronic book having a port and an on-board storage;
an upgrade tag; and
an upgrade code accessible to the processor;
wherein if the processor determines the cartridge storage is present at the port of the electronic book by matching the upgrade tag with a predefined tag code in the electronic book and identifies a transfer mode, the processor executes the upgrade code to transfer information between the on-board storage and the cartridge storage according to the identified transfer mode.

12. The apparatus of claim 11 wherein the upgrade code is transferred to the electronic book before being executed.

13. The apparatus of claim 11 wherein the transfer mode is one of a copy mode and a restore mode.

14. The apparatus of claim 13 wherein the processor transfers content of the on-board storage to the cartridge storage when the identified transfer mode is the copy mode.

15. The apparatus of claim 13 wherein the processor transfers content of the cartridge storage to the on-board storage when the identified transfer mode is the restore mode.

16. The apparatus of claim 11 wherein the on-board storage is one of a full data programmable read-only memory (PROM) and a flash file system.

17. The apparatus of claim 16 wherein the cartridge storage is one of a cartridge programmable read-only memory (PROM) and a cartridge content.

18. The apparatus of claim 17 wherein the full data PROM corresponds to the cartridge PROM during a transfer of information between the on-board storage and the cartridge storage.

19. The apparatus of claim 17 wherein the flash file system corresponds to the cartridge content during a transfer of information between the on-board storage and the cartridge storage.

20. The apparatus of claim 11 wherein the transfer mode is selected by a user.

21. A system comprising:
an electronic book containing a processor, an on-board storage, and a port; and
a cartridge comprising:
a cartridge storage accessible to the processor for storing information corresponding to the on-board storage,
an upgrade tag, and
an upgrade code accessible to the processor,
wherein if the processor determines the cartridge storage is present at the port of the electronic book by matching the upgrade tag with a predefined tag code in the electronic book and identifies a transfer mode, the processor executes the upgrade code to transfer information between the on-board storage and the cartridge storage according to the identified transfer mode.

22. The system of claim 21 wherein the upgrade code is transferred to the electronic book before being executed.

23. The system of claim 21 wherein the transfer mode is one of a copy mode and a restore mode.

24. The system of claim 23 wherein the processor transfers content of the on-board storage to the cartridge storage when the identified transfer mode is the copy mode.

25. The system of claim 23 wherein the processor transfers content of the cartridge storage to the on-board storage when the identified transfer mode is the restore mode.

26. The system of claim 21 wherein the on-board storage is one of a full data programmable read-only memory (PROM) and a flash file system.

27. The system of claim 26 wherein the cartridge storage is one of a cartridge programmable read-only memory (PROM) and a cartridge content.

28. The system of claim 27 wherein the full data PROM corresponds to the cartridge PROM during a transfer of information between the on-board storage and the cartridge storage.

29. The system of claim 27 wherein the flash file system corresponds to the cartridge content during a transfer of information between the on-board storage and the cartridge storage.

30. The system of claim 21 wherein the transfer mode is selected by a user.

* * * * *